United States Patent
Liukku et al.

(10) Patent No.: US 11,977,094 B2
(45) Date of Patent: *May 7, 2024

(54) SEESAW ACCELEROMETER

(71) Applicant: MURATA MANUFACTURING CO., LTD., Nagaokakyo (JP)

(72) Inventors: Matti Liukku, Helsinki (FI); Ville-Pekka Rytkönen, Klaukkala (FI); Anssi Blomqvist, Helsinki (FI)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,564

(22) Filed: Jul. 5, 2022

(65) Prior Publication Data
US 2023/0003759 A1    Jan. 5, 2023

(30) Foreign Application Priority Data

Jul. 5, 2021    (FI) ..................................... 20215784
Sep. 3, 2021   (FI) ..................................... 20215934

(51) Int. Cl.
*G01P 15/08*       (2006.01)
*G01P 15/125*     (2006.01)

(52) U.S. Cl.
CPC ........ *G01P 15/0802* (2013.01); *G01P 15/125* (2013.01); *G01P 2015/0831* (2013.01); *G01P 2015/0857* (2013.01); *G01P 2015/086* (2013.01)

(58) Field of Classification Search
CPC ........ G01P 15/125; G01P 15/18; G01P 15/08; G01P 2015/0831; G01P 2015/0857; G01P 2015/086
See application file for complete search history.

(56) References Cited

U.S. PATENT DOCUMENTS

| | | | |
|---|---|---|---|
| 8,973,439 B1 * | 3/2015 | Baldasarre | G01P 15/125 73/504.12 |
| 2006/0021436 A1 * | 2/2006 | Kapser | G01P 15/18 73/514.01 |
| 2006/0032310 A1 | 2/2006 | Merassi et al. | |

(Continued)

OTHER PUBLICATIONS

Finnish Search Report corresponding to FI Patent Appln. No. 20215934, dated May 11, 2022.

(Continued)

*Primary Examiner* — Helen C Kwok
(74) *Attorney, Agent, or Firm* — SQUIRE PATTON BOGGS (US) LLP

(57) ABSTRACT

A microelectromechanical accelerometer for measuring acceleration, comprising a first proof mass and ae second proof mass. The first proof mass is adjacent to the second proof mass. A suspension structure allows the first proof mass to undergo rotation out of the device plane about a first rotation axis and the suspension structure allows the second proof mass to undergo rotation out of the device plane about a second rotation axis. The first and second rotation axes are parallel to each other and define an x-direction which is parallel to the first and the second rotation axes and a y-direction which is perpendicular to the x-direction. The y-coordinate of the first rotation axis is greater than the y-coordinate of the second rotation axis by a nonzero distance D.

13 Claims, 11 Drawing Sheets

(56) References Cited

U.S. PATENT DOCUMENTS

| | | | |
|---|---|---|---|
| 2007/0000323 A1* | 1/2007 | Kuisma | G01P 15/0802 29/595 |
| 2008/0110260 A1* | 5/2008 | Konno | G01P 15/125 73/514.32 |
| 2008/0158370 A1* | 7/2008 | Pasolini | H04N 23/6812 348/208.4 |
| 2008/0173959 A1* | 7/2008 | Merassi | B81B 3/0051 73/514.24 |
| 2009/0139331 A1* | 6/2009 | Axelrod | G01P 15/18 73/514.32 |
| 2010/0122579 A1* | 5/2010 | Hsu | G01P 15/18 73/514.32 |
| 2011/0203373 A1* | 8/2011 | Konno | G01P 15/0802 73/514.32 |
| 2011/0291644 A1 | 12/2011 | Kanemoto | |
| 2012/0186347 A1* | 7/2012 | McNeil | G01P 15/125 73/514.32 |
| 2013/0192362 A1* | 8/2013 | Rytkonen | G01P 15/08 73/504.08 |
| 2013/0192371 A1* | 8/2013 | Rytkonen | G01P 15/125 73/514.01 |
| 2014/0069190 A1* | 3/2014 | Tanaka | G01P 15/0802 156/60 |
| 2014/0251011 A1* | 9/2014 | Zhang | G01P 15/08 73/514.16 |
| 2014/0283605 A1* | 9/2014 | Baldasarre | G01P 15/125 73/514.32 |
| 2015/0029690 A1* | 1/2015 | Tanaka | G01P 15/125 361/777 |
| 2016/0041194 A1 | 2/2016 | Rytkonen et al. | |
| 2017/0276696 A1* | 9/2017 | Yoshida | G01P 15/18 |
| 2018/0238925 A1* | 8/2018 | Acar | G01P 15/125 |
| 2018/0246141 A1* | 8/2018 | Taketani | G01P 15/18 73/514.32 |
| 2019/0100426 A1* | 4/2019 | Painter | G01P 15/125 73/514.32 |
| 2019/0101562 A1* | 4/2019 | Kigure | G01P 15/125 |
| 2019/0339078 A1 | 11/2019 | McNeil | |
| 2020/0018777 A1 | 1/2020 | Liukku et al. | |
| 2021/0396781 A1* | 12/2021 | McNeil | B81B 3/0051 |
| 2023/0003760 A1* | 1/2023 | Liukku | G01P 15/125 |

OTHER PUBLICATIONS

European Search Report dated Nov. 11, 2022, corresponding to European Patent Application No. 22180680.

* cited by examiner

SEESAW ACCELEROMETER

FIELD OF THE DISCLOSURE

The present disclosure relates to microelectromechanical (MEMS) devices for measuring acceleration, and more particularly to accelerometers comprising proof masses which can rotate in seesaw motion out of a device plane when the accelerometer undergoes acceleration in a direction which is perpendicular to a device plane.

BACKGROUND OF THE DISCLOSURE

A MEMS accelerometer typically comprises a device wafer or alternatively a device layer deposited on a substrate. Micromechanical structures are formed in the device wafer or device layer by etching. The device wafer or layer defines a device plane. In this disclosure, the device plane will be illustrated as the xy-plane.

A proof mass formed in the device plane can be configured to respond to acceleration in the direction of a z-axis (which is perpendicular to the xy-plane) by rotating in seesaw motion about a rotation axis which lies in the xy-plane. The proof mass needs to be asymmetric with respect to this rotation axis so that it's center of mass does not lie on the axis. The proof mass may be suspended from fixed anchor points by suspenders which are sufficiently thin to undergo torsional twisting when the accelerometer experiences acceleration in the z-direction and the proof mass begins to turn out of the xy-plane.

FIG. 1a illustrates a MEMS accelerometer with two proof masses 11 and 12. These proof masses are suspended from anchor points 18 by torsion elements which allow the proof masses 11 and 12 to rotate about a rotation axis 191 when the accelerometer undergoes acceleration in the z-direction. The movement of the proof masses in the z-direction can for be detected with a capacitive measurement between the proof mass and a counter-electrode.

FIG. 1b illustrates a cross section of the accelerometer where proof mass 11 is visible. Counter-electrodes 171 and 172 have been placed on a surface 195 which is adjacent to the proof mass 11 in the z-direction. Corresponding measurement areas 111 and 112 are indicated on the proof mass 11.

Counter electrodes 171 and 172 may be placed on opposite sides of the rotation axis 191 to facilitate a differential capacitive measurement. A differential measurement makes the measured signal less sensitive to some external disturbances because the contribution these disturbances make to the signal on one side of the axis is automatically cancelled by the contribution they make on the other side of the axis.

In an accelerometer where two proof masses are used, the measured signal can be further improved by conducting a double differential measurement where the measurement signal from proof mass 11 (which is, in itself, a differential signal) is read differentially with respect to the measurement signal from proof mass 12 (which is also in itself a differential signal).

Document US2011291644 discloses an accelerometer where, in some embodiments, a double differential measurement is performed. A problem with the device presented in this disclosure is that the proof masses consume a lot of surface area.

BRIEF DESCRIPTION OF THE DISCLOSURE

An object of the present disclosure is to provide an apparatus which alleviates the above disadvantage. The object of the disclosure is achieved by what is stated in the independent claim. The preferred embodiments of the disclosure are disclosed in the dependent claims.

The disclosure is based on the idea of suspending two adjacent proof masses for out-of-plane seesaw motion so that their rotation axes are placed apart from each other and placing measurement electrodes the same distance apart from each other, so that a reliable double differential measurement can be performed in tight configuration where the surface area is minimized.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

Figure 1A:
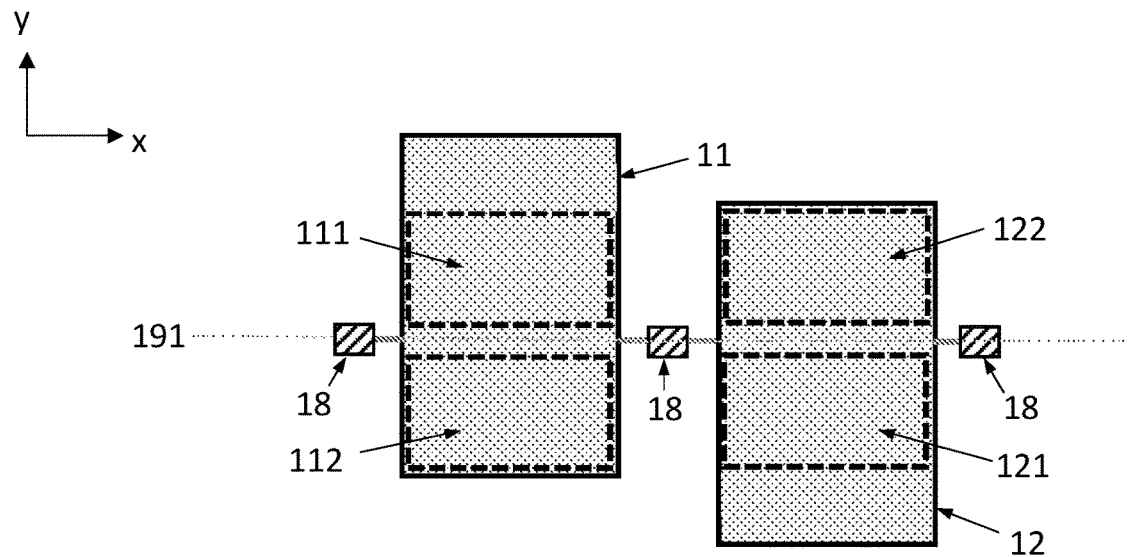
FIGS. 1a and 1b illustrate an accelerometer with two proof masses.
Figure 1B:
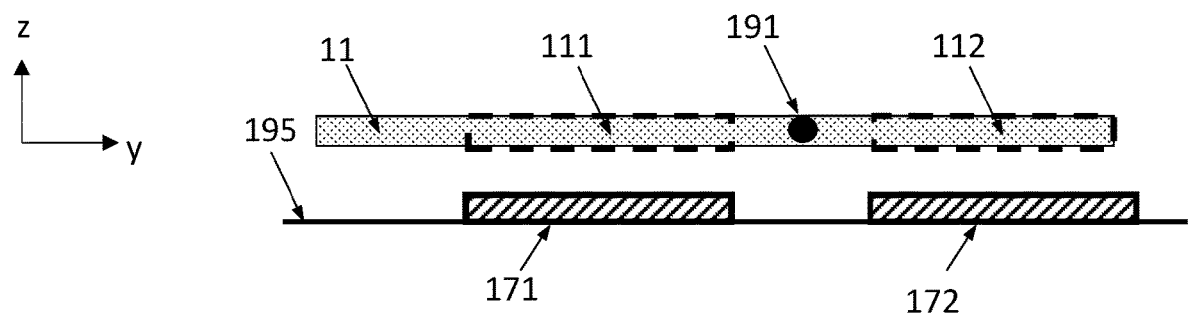

This disclosure describes a microelectromechanical accelerometer for measuring acceleration in the direction of a z-axis which is perpendicular to an xy-plane defined by a device layer. The accelerometer comprises a mobile first proof mass and a mobile second proof mass formed in the device layer and suspended from one or more fixed parts of the accelerometer by a suspension structure. The first proof mass is adjacent to the second proof mass in the xy-plane. The suspension structure allows the first proof mass to undergo rotation out of the xy-plane about a first rotation axis, and the suspension structure allows the second proof mass to undergo rotation out of the xy-plane about a second rotation axis.

The first and the second rotation axes are parallel to each other and define an x-direction which is parallel to the first and the second rotation axes and a y-direction which is perpendicular to the x-direction. The y-coordinate of the center of mass of the first proof mass is greater than the y-coordinate of the first rotation axis, and the y-coordinate of the center of mass of the second proof mass is less than the y-coordinate of the second rotation axis. The y-coordinate of the first rotation axis is greater than the y-coordinate of the second rotation axis by a nonzero distance D.

The accelerometer comprises a first counter-electrode and a second counter-electrode which are adjacent to the first proof mass in the z-direction. The size and geometry of the first counter electrode together with the adjacent edges of the first proof mass define a first measurement region on the first proof mass on a first side of the first rotation axis. The size and geometry of the second counter electrode together with the adjacent edges of the first proof mass define a second measurement region on the first proof mass on a second side of the first rotation axis.

The accelerometer also comprises a third counter-electrode and a fourth counter-electrode which are adjacent to the second proof mass in the z-direction. The size and geometry of the third counter electrode together with the adjacent edges of the second proof mass define a third measurement region on the second proof mass on a first side of the second rotation axis. The size and geometry of the fourth counter-electrode together with the adjacent edges of the second proof mass define a fourth measurement region on the second proof mass on a second side of the second rotation axis.

The areas and shapes of the first, second, third and fourth measurement regions are all substantially equal in the xy-plane. The first measurement region and the second measurement region are substantially reflection-symmetric with respect to the first rotation axis. The third measurement region and the fourth measurement region are substantially reflection-symmetric with respect to the second rotation axis.

The device layer may be a structural layer formed in a device wafer, or it may be a device layer deposited on a substrate.

In this disclosure the device plane is illustrated and referred to as the xy-plane. The device plane is determined by the device layer where proof masses and suspension structures are formed by etching. The vertical z-axis is perpendicular to the xy-plane. Motion where the center of gravity of a proof mass moves in a vertical direction may be referred to as out-of-plane motion, or motion out of the device plane. Motion where the center of gravity of a proof mass moves in the xy-plane may be referred to as in-plane motion, or motion in the device plane. The center of gravity of each proof mass may lie in the device plane when the proof mass is in its rest position. The micromechanical structures which form the mobile parts (such as proof masses and flexible suspenders) of the accelerometer can be prepared in the device layer by etching the layer. When the structures are completed, the fixed parts of the device layer typically form a supporting body which surrounds the mobile parts in the device plane. The device layer may be a silicon layer. The device layer may require structural support from a separate, much thicker support wafer or substrate during manufacturing and/or in the finished component. These thicker wafers may also be called handle wafers.

Each of the first and second proof masses forms a seesaw, which may also be called a teeter-totter. Each seesaw responds to acceleration in the direction of the z-axis with out-of-plane rotation. If the seesaws are not coupled to each other, the response of each seesaw is independent of the response of the other.

Anchor points are fixed structures which do not undergo any movement with respect to the fixed surroundings of the accelerometer when the device undergoes acceleration. The proof masses are suspended from these anchor points with suspension structures. These suspension structures include at least some flexible parts, such as torsionally flexible torsion elements. The suspension structures may also include substantially rigid extension parts which may be fixed at one end to an anchor point. These extensions are dimensioned so that they undergo far less elastic deformation than the flexible parts when the device is in operation.

The parts of the suspension structure which flexibly allow out-of-plane motion are referred to as torsion elements in this disclosure. In this disclosure torsion elements are illustrated as bars which are narrow in the direction which is perpendicular to the corresponding rotation axis. Other torsionally flexible structures, like e.g. meander springs, could alternatively be used. In the figures of this disclosure each torsion element in a suspension structure lies on the corresponding rotation axis. However, a torsion element can alternatively comprise two or more torsionally flexible parts on different sides of the axis, and in that case none of these parts needs to lie exactly on the rotation axis. This option has not been illustrated, but it could be implemented for any torsion element.

The center of gravity of each proof mass lies off its rotation axis. The suspension arrangement can be configured to allow torsional twisting about the rotation axis. By dimensioning the suspension arrangement suitably, it allows the proof mass to rotate out of the device plane when a given minimum amount of z-axis acceleration is exceeded. The proof mass then undergoes a designed amount of out-of-plane rotation in response to z-axis acceleration of a certain magnitude. The torsional stiffness of the suspension arrangements can be selected so that suitable tilt angles are obtained in the range of z-axis acceleration values where the sensor is expected to operate. The tilt angle of a proof mass can be measured capacitively between the proof mass and an opposing fixed structure. The magnitude of the acceleration can be calculated from this measurement.

Figure 2A:
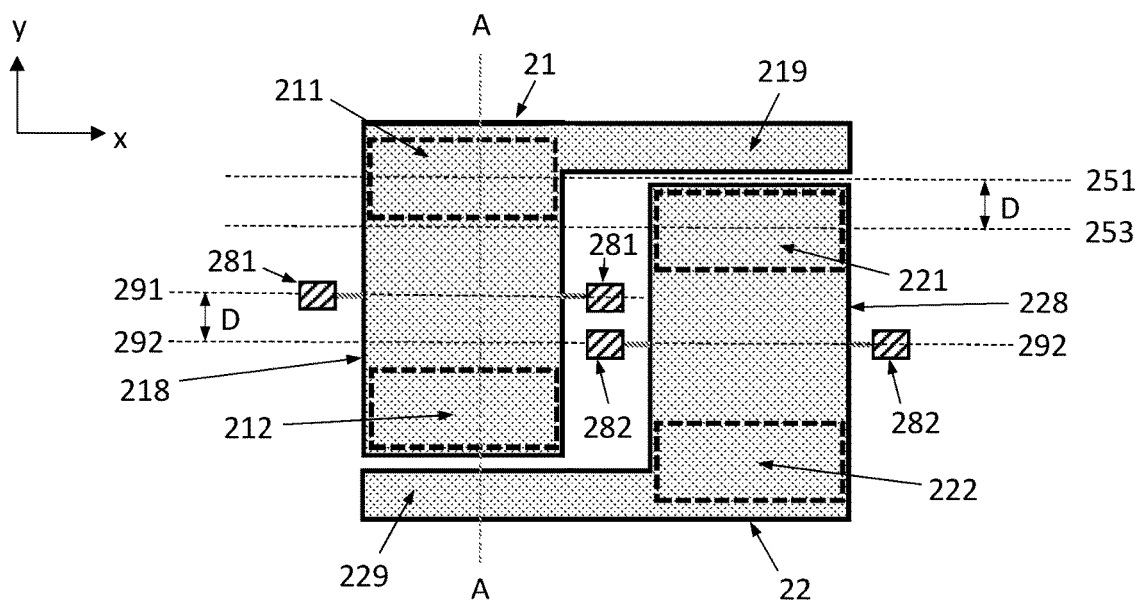
FIGS. 2a-2d illustrate two proof masses with different rotation axes.

FIG. 2a illustrates an accelerometer. The illustrated x-axis here shows the positive x-direction, i.e. the direction in which the x-coordinate increases. A first proof mass 21 is suspended from first anchor points 281. A second proof mass 22 is suspended from second anchor points 282. Each proof mass could alternatively be suspended from just one anchor point.

In FIG. 2a the y-axis illustrates the positive y-direction, i.e. the direction in which the y-coordinate increases. Due to the asymmetric shape of the first proof mass 21, the y-coordinate of the center of mass of the first proof mass is greater than the y-coordinate of the first rotation axis 291. Similarly, due to the asymmetric shape of the second proof mass the y-coordinate of the center of mass of the second proof mass 22 is less than the y-coordinate of the second rotation axis 292. The first and second proof masses will therefore rotate in opposite out-of-plane directions when the accelerometer undergoes acceleration in the z-direction which is perpendicular to the xy-plane.

Figure 2B:
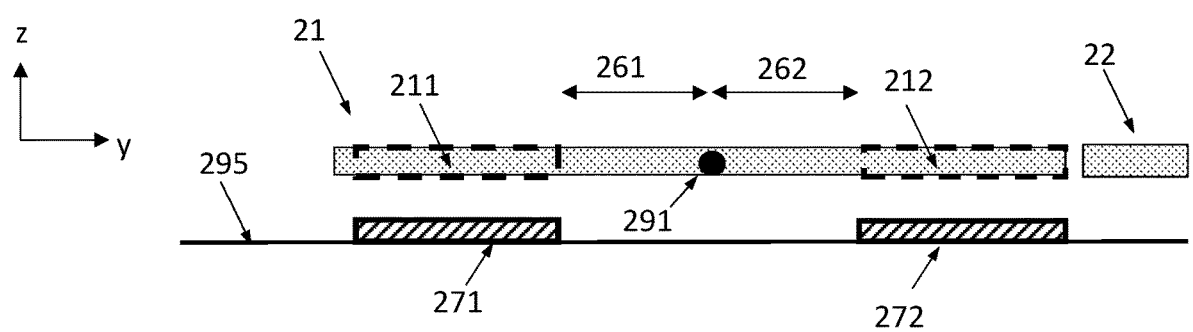

FIG. 2b illustrates a cross-section of the accelerometer in the yz-plane along the line A-A in FIG. 2a. Counter-electrodes 271 and 272 for the capacitive measurement are located on a surface 195 which is adjacent to the proof masses. This surface may for example the surface of a packaging wafer or substrate to which the fixed parts of the device are attached. The first and second measurement regions 211-212 are illustrated in FIGS. 2a and 2b.

The measurement regions could be defined with a conductive electrode deposited on the first proof mass opposite to the counter-electrode. The area in the xy-plane where the electrode overlaps with the counter-electrode would then be the measurement region. But if the proof mass is sufficiently conductive, the mass itself can be used as the electrode in the capacitive measurement. In this case the electrically active measurement region on the proof mass is determined by the size and geometry of the corresponding counter-electrode and the edges of the proof mass which are adjacent to this counter-electrode.

The counter-electrode may extend to an area of the xy-plane where the proof mass does not extend. Since the measurement region lies on the proof mass, the measurement region will obviously not extend beyond the proof mass in the xy-plane. So even if counter-electrode 271 would extend further to the left in FIG. 2b, the measurement region 211 would remain the same. If the proof mass 21 has a uniform thickness in the z-direction, the measurement region lies in the area of the xy-plane where the proof mass overlaps with the counter-electrode. This area is delimited by the edges of the counter-electrode if the counter-electrode does not extend beyond the proof mass (as in FIGS. 2a and 2b), but it will be limited by an edge of the proof mass if the counter-electrode extends beyond that edge.

Figure 2C:
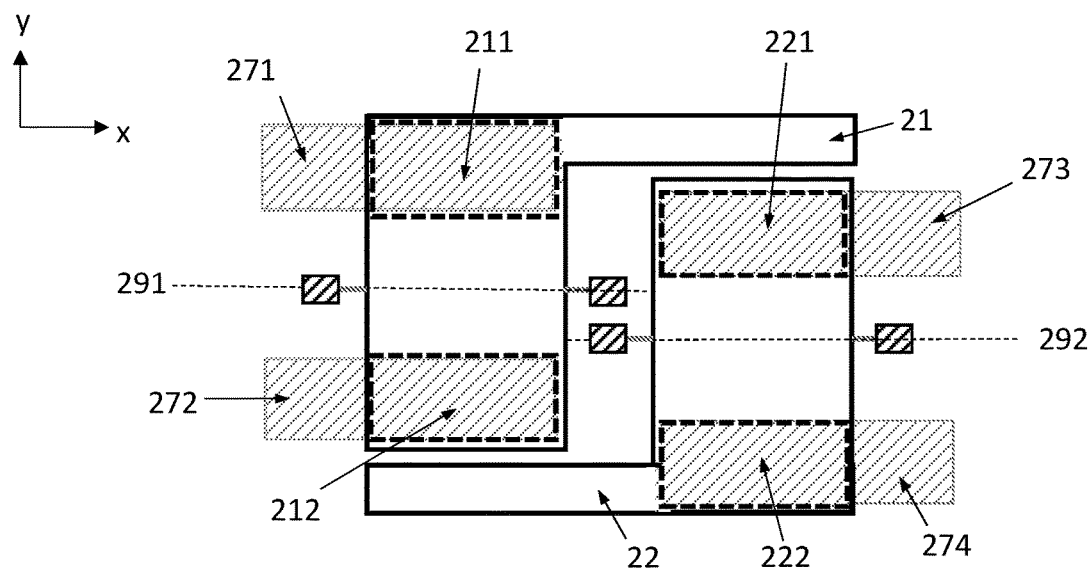

The areas of the first and second measurement regions 211 and 212 in FIG. 2a in the xy-plane correspond to the areas of the underlying counter-electrodes 271 and 272, respectively, illustrated in FIG. 2b. The areas of the third and fourth measurement regions 221 and 222 in the xy-plane also correspond to the areas of two underlying counter-electrodes (not shown in FIG. 2b). FIG. 2c illustrates proof masses 21-22 in the xy-plane and underlying (or overlying) counter-electrodes 271-274 which extend beyond one edge of the corresponding proof mass. That edge of the proof mass then delimits and defines the corresponding measurement regions 211-212 and 221-222 in the proof masses 21 and 22.

Figure 2D:
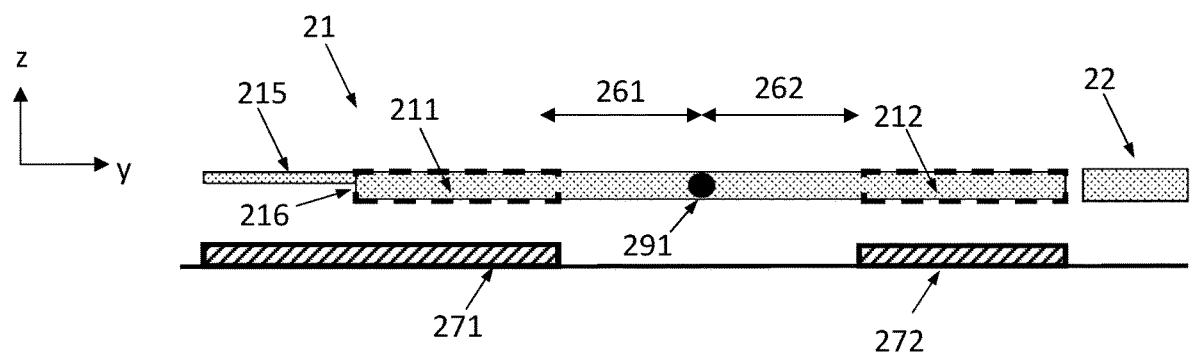

However, the measurement region does not necessarily always coincide with the area of the xy-plane where the proof mass overlaps with the counter-electrode. This is because the edge which delimits the measurement region does not necessarily have to be the outer edge of the proof mass. A proof mass may comprise trenches or other structures so that the vertical thickness of the proof mass varies with the x- and/or the y-coordinate. FIG. 2d illustrates an example where the proof mass 21 comprises a vertical step 216 and a vertically thin part 215. The vertical step 216 forms an edge which delimits and defines the measurement region. Even though the counter-electrode 271 extends far to the left and the thin part 215 of the proof mass 21 also overlaps with that counter-electrode, the vertical gap between the counter-electrode 271 and the thin part 215 can deliberately be made so much greater than the corresponding gap on the other side of the step 216 that the measurement region 211 is in practice delimited by the step 216. The contribution provided of the thin part 215 will be negligible.

Because the first measurement region 211 and the second measurement region 212 are substantially reflection-symmetric with respect to the first rotation axis 291, the distance 261 from the first rotation axis 291 to the border of the first measurement region 211 is substantially equal to the distance 262 from the first rotation axis 291 to the border of the second measurement region 212. The reflection-symmetry of the regions 211 and 212 also facilitates a differential capacitive measurement from the two opposing sides of the first proof mass 21. The corresponding symmetries apply also for the third and fourth measurement regions 221-222 on the second proof mass.

As mentioned above, the y-coordinate of the first rotation axis 291 is greater than the y-coordinate of the second rotation axis 292 by a nonzero distance D which has been indicated in FIG. 2a. The y-coordinate of the center of the first measurement region 211 is then also greater than the y-coordinate of the center of the third measurement region 221 by the distance D. This is illustrated in FIG. 2a as the distance in the y-direction between the two lines 251 and 253 which cross the centers of the first and third measurement regions 211 and 221, respectively.

Due to the reflection symmetries mentioned above, it can be concluded that the y-coordinate of the center of the second measurement region 212 is greater than the y-coordinate of the center of the fourth measurement region 222 by the same distance D. It can also be concluded that the distances (which are not illustrated) from the second rotation axis 292 to the border of the third measurement region 221 and to the border of the fourth measurement region 222 is equal to the distances 261 and 262 in FIG. 2b.

Consequently, the geometry of regions 221 and 222 on the second proof mass facilitate a differential capacitive measurement from the two opposing sides of the second proof mass 22, and the symmetry of all four measurement regions 211-212 and 221-222 facilitates a double differential measurement capacitive measurement $S=S_{211}-S_{212}+(S_{221}-S_{222})$, where is the output signal and the other four are the individual signals measured from the measurement region indicated by the subscript.

It is in general more advantageous to place each measurement region far from the corresponding rotation axis than to place it close to the rotation axis. This is because the signal measured from the measurement region will exhibit a greater dependence on the rotational displacement of the proof mass when the distance from the rotation axis to the measurement region is greater. In other words, the signal measured from the measurement region compared to maximum proof mass displacement will be larger if the distance from the rotation axis to the measurement region is greater. On the other hand, the total area of the accelerometer should preferably be minimized.

A first end of the first proof mass (the upper end in FIG. 2a) has a first y-coordinate and a second end of the first proof mass (the lower end in FIG. 2a) has a second y-coordinate and the first y-coordinate differs from the second. A first end of the second proof mass (the lower end in FIG. 2a) has a third y-coordinate and a second end of the second proof mass (upper end in FIG. 2a) has a fourth y-coordinate, and the third y-coordinate differs from the fourth. FIG. 2a illustrates that the first measurement region 211 may extend substantially to the first y-coordinate, and the second measurement region 212 may extend substantially to the second y-coordinate. Furthermore, the third measurement region 221 may extend substantially to the third y-coordinate and the fourth measurement region 222 may extend substantially to the fourth y-coordinate.

Alternatively, some or all of the measurement regions may be located at a distance from the first and/or second ends of the proof masses, as illustrated for example for regions 211 and 222 in FIG. 2a.

The first and second proof masses have to be asymmetric with respect to their respective rotation axes so that their center of gravity does not lie on that rotation axis. FIG. 2a illustrates that this asymmetry can for example be achieved by making the first end of each mass wide in the direction of the x-axis. The first proof mass 21 may for example comprise a protrusion 219 at its first end which extends substantially to the same x-coordinate as the outer side 228 of the second proof mass 22. Correspondingly, the second proof mass 22 may comprise a protrusion 229 at its first end which extends substantially to the same x-coordinate as the outer side 218 of the first proof mass 21. Alternatively, the first and second proof masses could comprise protrusions which make the proof masses wider in the x-direction somewhere between their first end and their rotation axis (with no corresponding protrusion on the other side of the rotation axis). The benefit of these alternative designs is that the measurement regions 211-214 can be brought all the way to the first and second ends of the proof masses, but the accelerometer as a whole still retains a compact size.

The first proof mass and the second proof mass may have substantially the same area and substantially the same length in the y-direction. The area of each measurement region may for example be greater than 10%, greater than 20%, greater than 30% or greater than 40% of the area of the proof mass where the region is located.

In this disclosure, the first proof mass may be considered adjacent to the second proof mass in the device plane when there exists a y-coordinate where both of these proof masses are present. A line can then be drawn in the x-direction which crosses both the first proof mass 21 and the second proof mass 22. Alternatively, the first proof mass may be considered adjacent to the second proof mass in the device plane when the first rotation axis 291 crosses the second proof mass 22 and the second rotation axis 292 crosses the first proof mass 21.

The distance from the first rotation axis to the first measurement region (and to the second measurement region) in the y-direction may for example be greater than 10% or greater than 20% of the length of the first proof mass in the y-direction. The distance from the second rotation axis to the third and fourth measurement regions may then also be greater than 10% or greater than 20% of the length of the second proof mass in the y-direction. The length of each measurement region in the y-direction may be greater than 20% or greater than 30% of the length of the first proof mass in the y-direction. The length of each measurement region in the y-direction may be greater than its width in the x-direction.

The accelerometer may comprise one or more central anchor points, which lie between the two proof masses. Both the first and the second proof mass may be suspended only from these one or more central anchor points.

The accelerometer may comprise, in addition to the one or more central anchor points, one or more side anchor points on the side of each proof mass. The side anchor points can for example be located within an opening in said proof mass, or next to the proof mass on its outer side (the side which is opposite to the central side in the x-direction). Each proof mass may be suspended from the one or more central anchor points and from the one or more side anchor points which lie on that side.

Alternatively, the accelerometer may comprise one or more side anchor points on the side of each proof mass as described in the previous paragraph, and both the first and the second proof mass may be suspended only from these one or more side anchor points.

FIGS. 3, 4, 5 and 7 illustrate examples suspension structures where the one or more fixed parts comprise a central anchor point located between the first proof mass and the second proof mass in the xy-plane.

Figure 3:
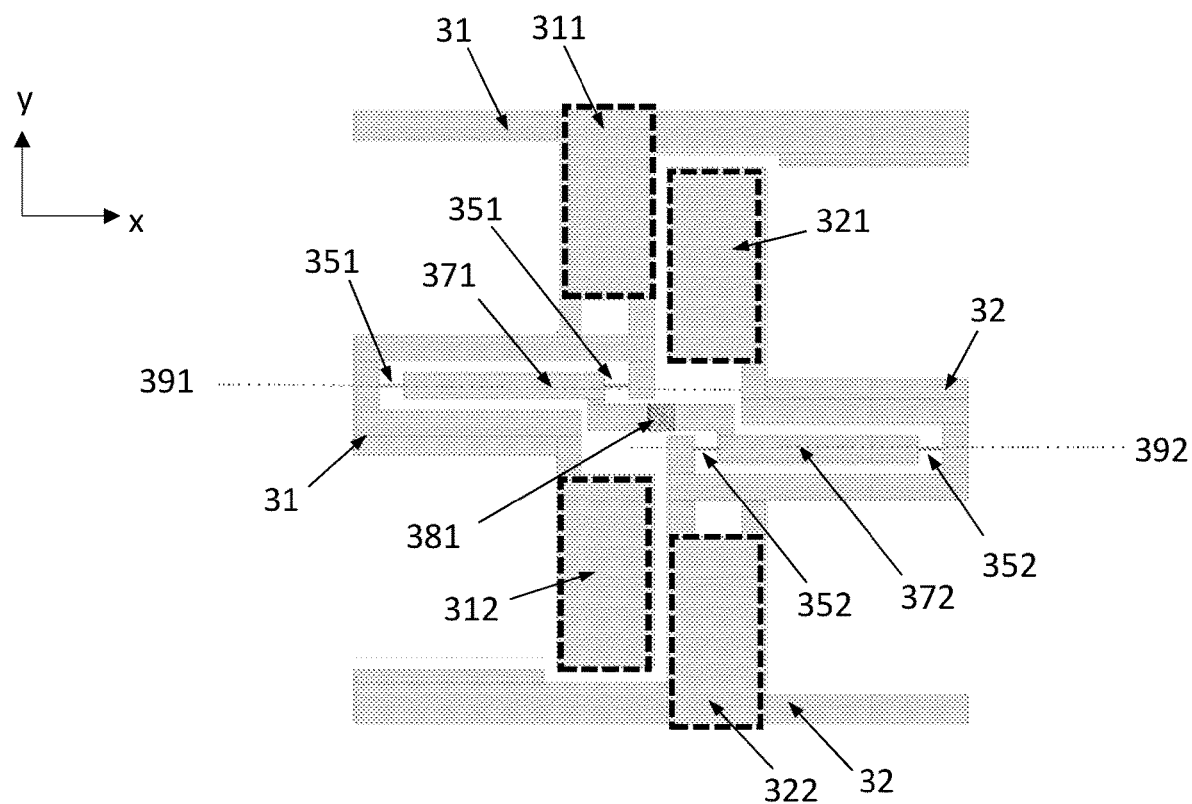
FIG. 3 illustrates a first example.

In the first example illustrated in FIG. 3, reference numbers 31, 32, 311-312, 321-322 and 391-392 correspond to reference numbers 21, 22, 211-212, 221-222 and 291-292, respectively, in FIG. 2a. Measurement regions 311-312 and 321-322 are illustrated in FIG. 3, but this illustration is omitted from some figures to preserve clarity. The shapes of the proof masses and measurement regions illustrated in the figures of these disclosure are only examples. Many alternative shapes would be possible.

In FIG. 3 the y-coordinate of the central anchor point 381 lies between the y-coordinate of the first rotation axis 391 and the y-coordinate of the second rotation axis 392. The suspension structure comprises a first rigid extension 371 which extends from the central anchor point 381 to the first rotation axis 391. The suspension structure further comprises at least one first torsion element 351 which extends from the first rigid extension 371 to the first proof mass 31. The suspension structure also comprises a second rigid extension 372 which extends from the central anchor point 381 to the second rotation axis 392. The suspension structure further comprises at least one second torsion element 352 which extends from the second rigid extension 372 to the second proof mass 32.

FIG. 3 illustrates two first torsion elements 351 which extend to the first proof mass 351 in opposite directions from the first rigid extension 371, and correspondingly two second torsion elements 352 which extend to the second proof mass 352 in opposite directions from the second rigid extension 372. However, one torsion element could alternatively be sufficient for supporting the weight of the proof mass. This consideration applies to all examples in this disclosure—even though proof masses are often illustrated to be suspended from two torsion elements which extend from the same rigid extension or from the same anchor point to said proof mass, even one torsion element may be sufficient.

Rigid extensions such as 371 form a part suspension structure in FIG. 3 and in other examples presented in this disclosure. The optimal size, geometry and location of the rigid extensions depends on the proof mass geometry, on the number of anchor points and their placement. In general, suitably placed and dimensioned rigid extensions in the suspension structure can make the accelerometer less sensitive to external disturbances by raising the resonance frequencies of undesired parasitic oscillation modes. In FIG. 3, for example, rigid extension 371 allow the two illustrated first torsion elements 351 to be placed relatively far away from each other, which raises the resonance frequency of an oscillation mode where proof mass 31 oscillates up and down in the z-direction without rotation, or where it rotates about the z-axis.

Figure 4:
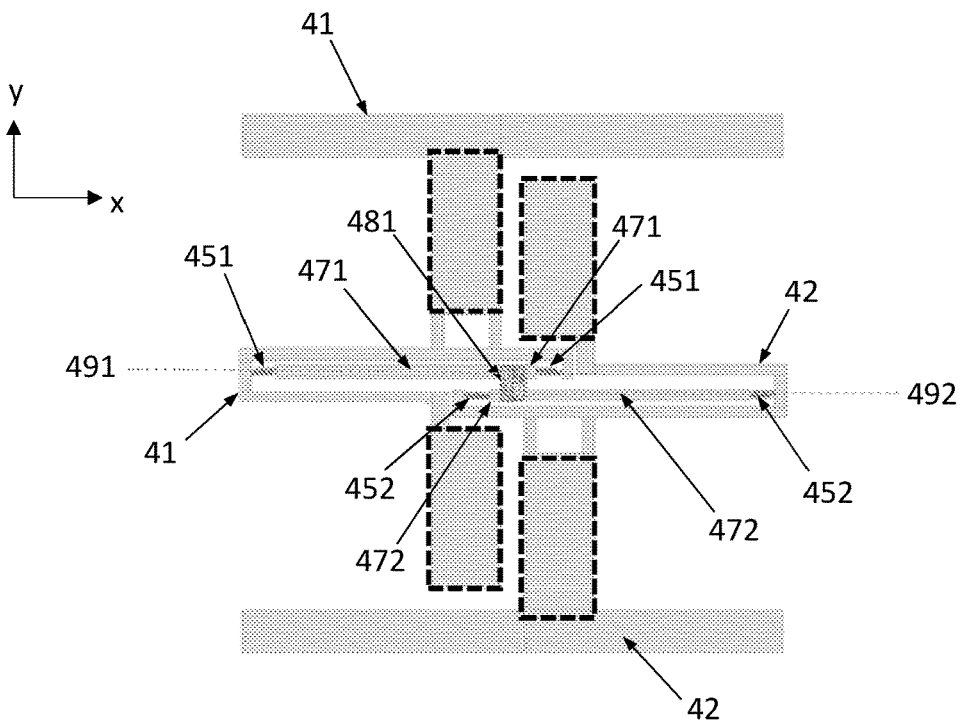
FIG. 4 illustrates a second example.

FIG. 4 illustrates a second example where reference numbers 41, 42 and 491-492 correspond to reference numbers 21, 22 and 291-292, respectively, in FIG. 2a. Here the central anchor point 481 extends from the first rotation axis 491 to the second rotation axis 492. The suspension structure comprises two first rigid extensions 471 which extend from the central anchor point 481 along the first rotation axis 491. The suspension structure further comprises two first torsion elements 451, and each first torsion element 451 extends from one of the two first rigid extensions 471 to the first proof mass 41. The suspension structure also comprises two second rigid extensions 472 which extend from the central anchor point 481 along the second rotation axis 492. The suspension structure further comprises two second torsion elements 452, and each second torsion element 452 extends from one of the two second rigid extensions 472 to the second proof mass 42.

Figure 5:
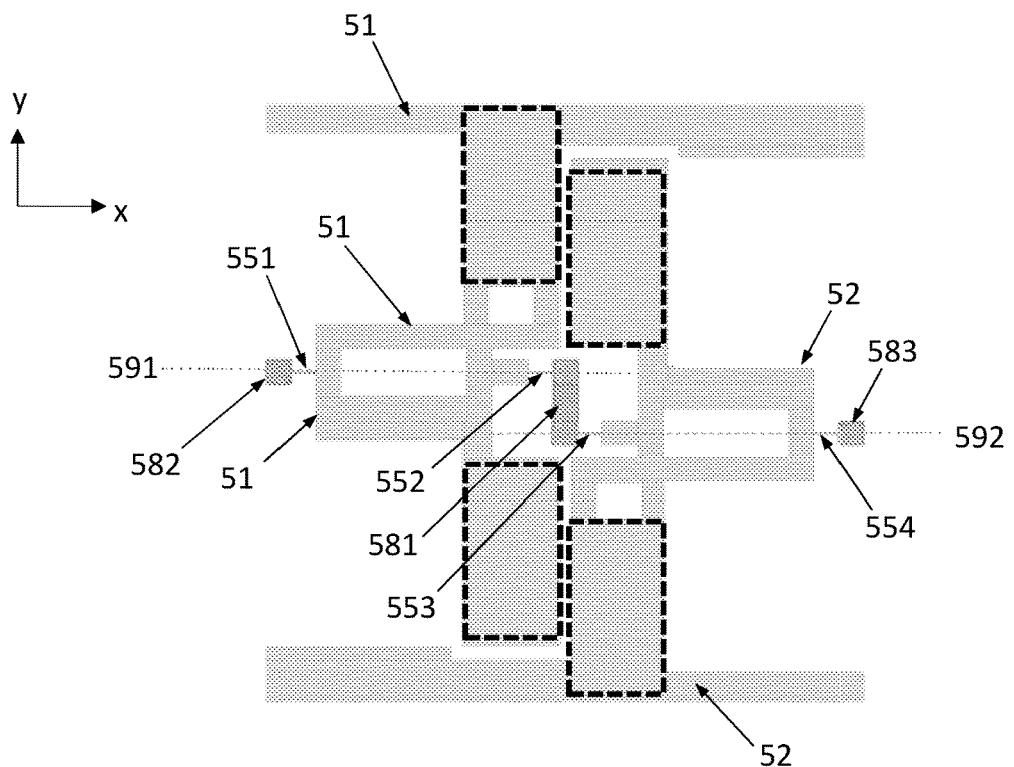
FIG. 5 illustrates a third example.

FIG. 5 illustrates a third example where reference numbers 51-52 and 591-592 correspond to reference numbers 21, 22 and 291-292, respectively, in FIG. 2a. In this example the central anchor point 581 extends from the first rotation axis 591 to the second rotation axis 592, but two separate central anchor points could alternatively be used. The one or more fixed parts also comprise a first side anchor point 582 located on the first rotation axis 591 on the side of the first proof mass 51 in the xy-plane and a second side anchor point 583 located on the second rotation axis 592 on the side of the second proof mass 52 in the xy-plane. The suspension structure also comprises a first side torsion element 551 which extends from the first side anchor point 582 to the first proof mass 51, a first central torsion element 552 which extends from the central anchor point 581 to the first proof mass 51, a second central torsion element 553 which extends from the central anchor point 581 to the second proof mass 52 and a second side torsion element 554 which extends from the second side anchor point 583 to the second proof mass 52.

Figure 6:
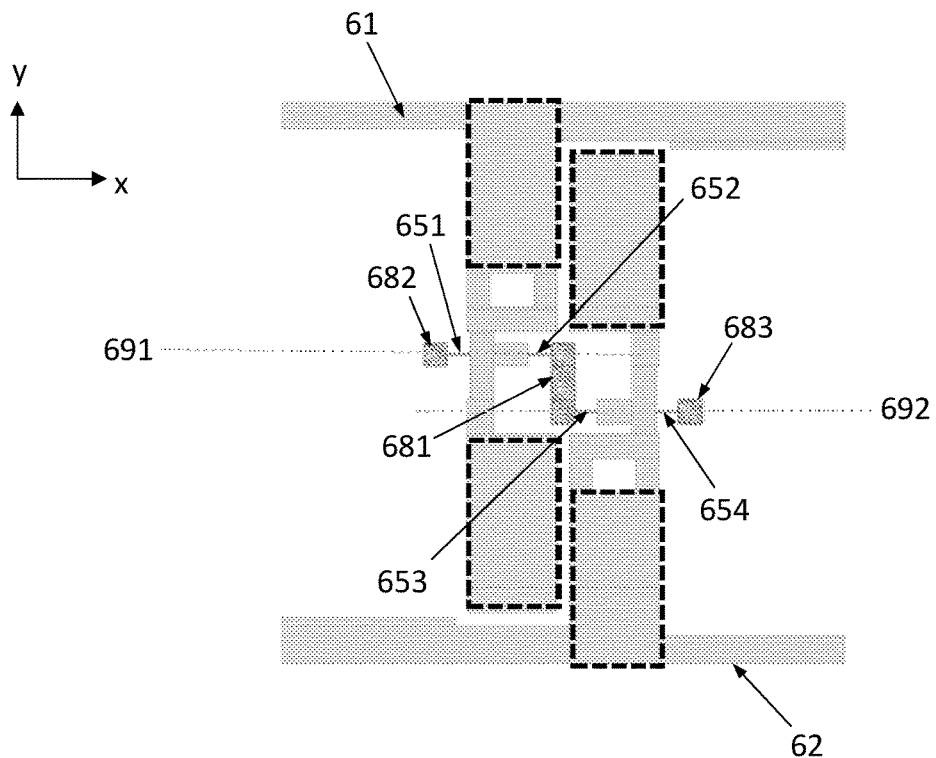
FIG. 6 illustrates a fourth example.

FIG. 6 illustrates a fourth example where reference numbers 61-62 and 691-692 correspond to reference numbers 21, 22 and 291-292, respectively, in FIG. 2a. In this example the central anchor point 681 extends from the first rotation axis 691 to the second rotation axis 692, but two separate central anchor points could alternatively be used. The one or more fixed parts also comprise a first side anchor point 682 located on the first rotation axis 691 on the side of the first proof mass 61 in the xy-plane and a second side anchor point 683 located on the second rotation axis 692 on the side of the second proof mass 62 in the xy-plane. The suspension structure comprises a first side torsion element 651 which extends from the first side anchor point 682 to the first proof mass 61. The suspension structure also comprises a first central torsion element 652 which extends from the central anchor point 681 to the first proof mass 61. The suspension structure also comprises a second central torsion element 653 which extends from the central anchor point 681 to the second proof mass 62. The suspension structure also comprises a second side torsion element 654 which extends from the second side anchor point 683 to the second proof mass 62.

Figure 7:
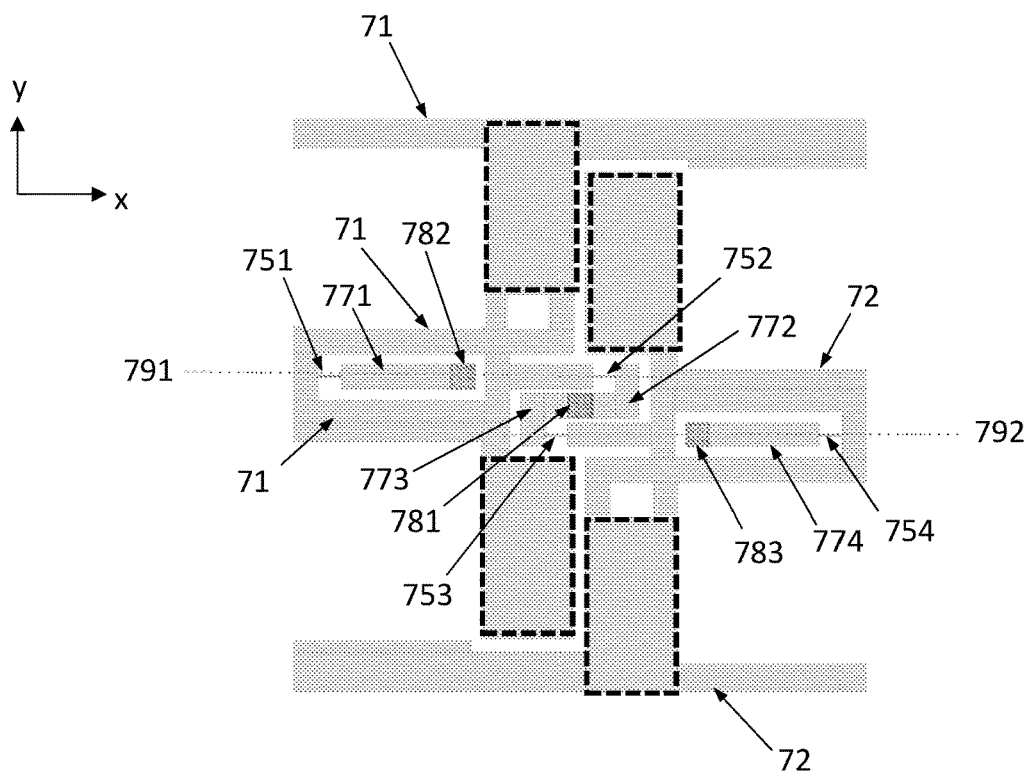
FIG. 7 illustrates a fifth example.

FIG. 7 illustrates a fifth example where reference numbers 71-72 and 791-792 correspond to reference numbers 21, 22 and 291-292, respectively, in FIG. 2a. The y-coordinate of central anchor point 781 lies between the y-coordinate of the first rotation axis 791 and the y-coordinate of the second rotation axis 792. The one or more fixed parts also comprise a first side anchor point 782 located on the first rotation axis 791 on the side of the first proof mass 71 in the xy-plane and a second side anchor point 783 located on the second rotation axis 792 on the side of the second proof mass 72 in the xy-plane. The suspension structure comprises a first rigid extension 771 which extends from the first side anchor point 782 along the first rotation axis 791 and a second rigid extension 772 which extends from the central anchor point 781 to the first rotation axis 791. The suspension structure also comprises a first torsion element 751 which extends from the first rigid extension 771 to the first proof mass 71 and a second torsion element 752 which extends from the second rigid extension 772 to the first proof mass 71.

The suspension structure further comprises a third rigid extension 773 which extends from the central anchor point 781 to the second rotation axis 792 and a fourth rigid extension 774 which extends from the second side anchor point 783 along the second rotation axis 792. The suspension structure also comprises a third torsion element 753 which extends from the third rigid extension 773 to the second proof mass 72 and a fourth torsion element 754 which extends from the fourth rigid extension 774 to the second proof mass 72.

Figure 8A:
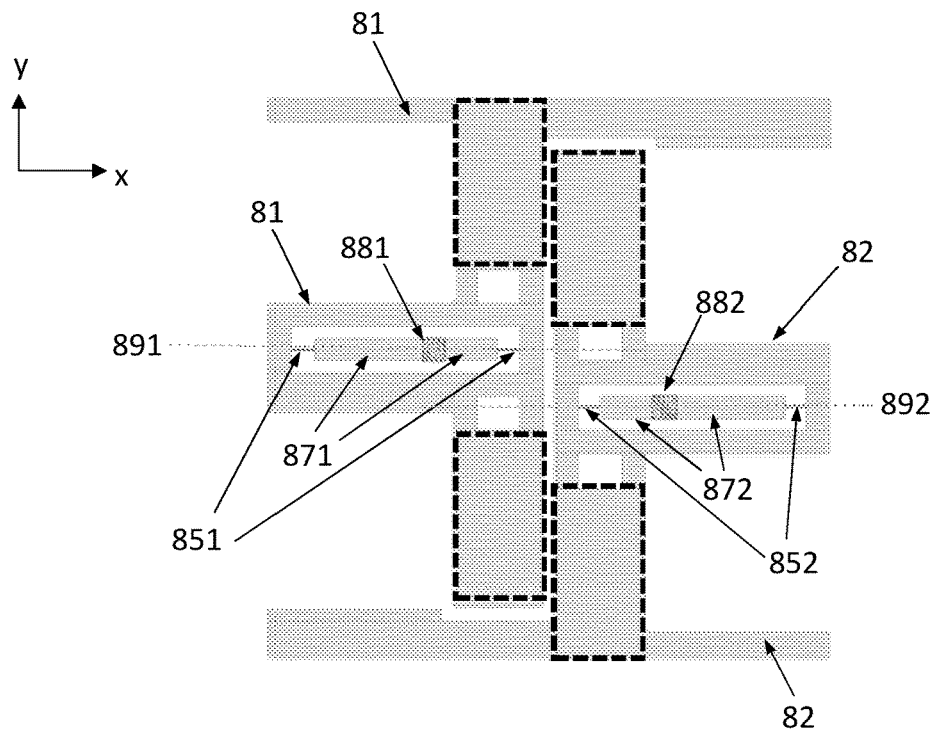
FIGS. 8a and 8b illustrate a sixth example.
Figure 8B:
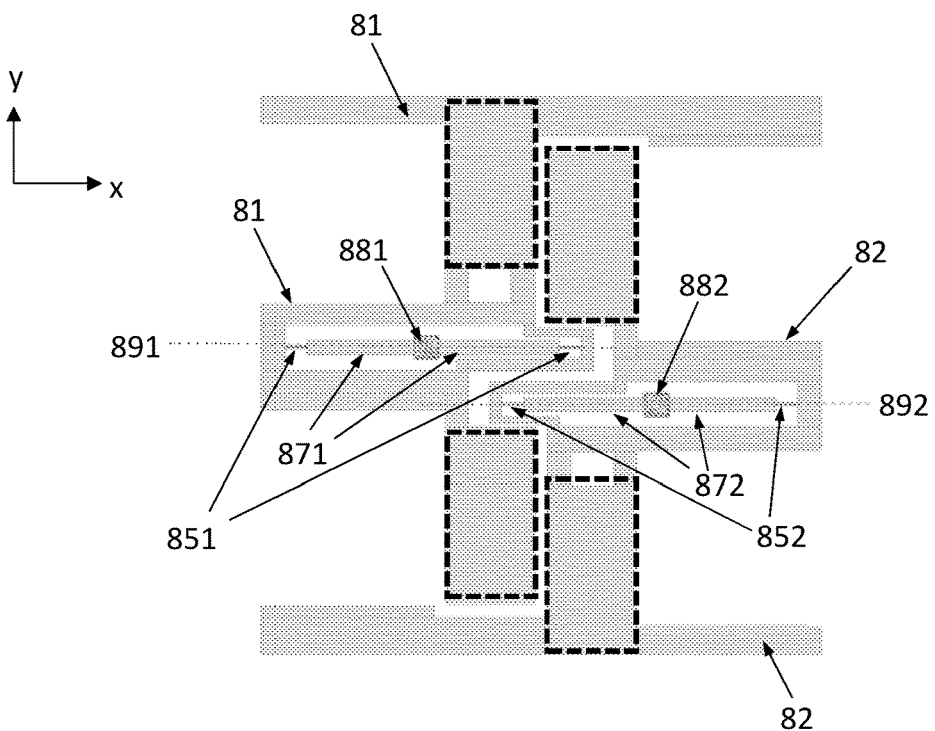

FIGS. 8a and 8b both illustrate a sixth example where reference numbers 81-82 and 891-892 correspond to reference numbers 21, 22 and 291-292, respectively, in FIG. 2a. In this example the one or more fixed parts comprise a first side anchor point 881 located on the first rotation axis 891 in an opening in the first proof mass 81 in the xy-plane and a second side anchor point 882 located on the second rotation axis 892 in an opening in the second proof mass 82 in the xy-plane. The suspension structure comprises one or more first rigid extensions 871 which extend from the first side anchor point 881 along the first rotation axis 891. The suspension structure further comprises one or more first torsion elements 851 which extend from said one or more first rigid extensions 871 to the first proof mass 81. The suspension structure also comprises one or more second rigid extensions 872 which extend from the second side anchor point 882 along the second rotation axis 892. The suspension structure further comprises one or more second torsion elements 852 which extend from said one or more second rigid extensions 872 to the second proof mass 82.

Figure 9:
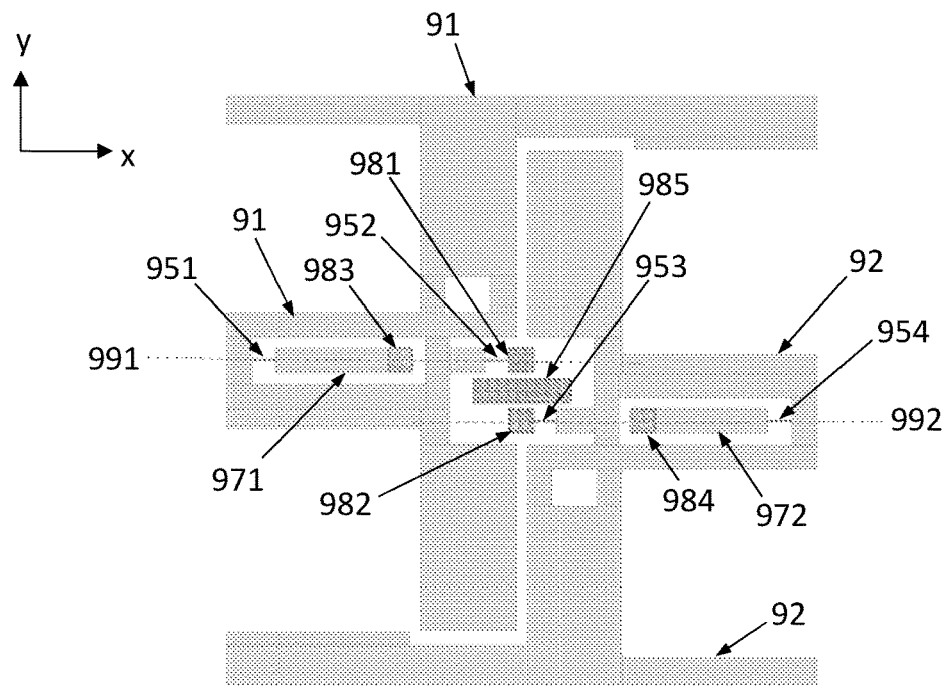
FIG. 9 illustrates a seventh example.

FIG. 9 illustrates an example where reference numbers 91-92 and 991-992 correspond to reference numbers 21, 22 and 291-292, respectively, in FIG. 2a. In this example the one or more fixed parts comprise a first central anchor point 981 and a second central anchor point 982 located between the first proof mass 91 and the second proof mass 92 in the xy-plane, a first side anchor point 983 located on the side of the first proof mass 91 in the xy-plane and a second side anchor point 984 located on the side of the second proof mass 92 in the xy-plane. The suspension structure comprises a first central torsion element 952 which extends from the first central anchor point 981 to the first proof mass 91 and a second central torsion element 953 which extends from the second central anchor point 982 to the second proof mass 92.

The suspension structure in FIG. 9 also comprises a first rigid side extension 971 which extends from the first side anchor point 983 along the first rotation axis 991 and a second rigid side extension 972 which extends from the second side anchor point 984 along the second rotation axis 992. The suspension structure comprises a first side torsion element 951 which extends from the first rigid side extension 971 to the first proof mass 91 and a second side torsion element 954 which extends from the second rigid side extension 972 to the second proof mass 92. Another alternative (not illustrates in FIG. 9) is that the suspension structure could comprises a first side torsion element which extends from the first side anchor point to the first proof mass and a second side torsion element which extends from the second side anchor point to the second proof mass. The device illustrated in FIG. 9 may optionally comprise an additional central anchor 985 placed between the first and second rotation axes 991 and 992 at or near the center of the accelerometer. This additional central anchor may for example be used as a support anchor for a capping wafer.

Figure 10:
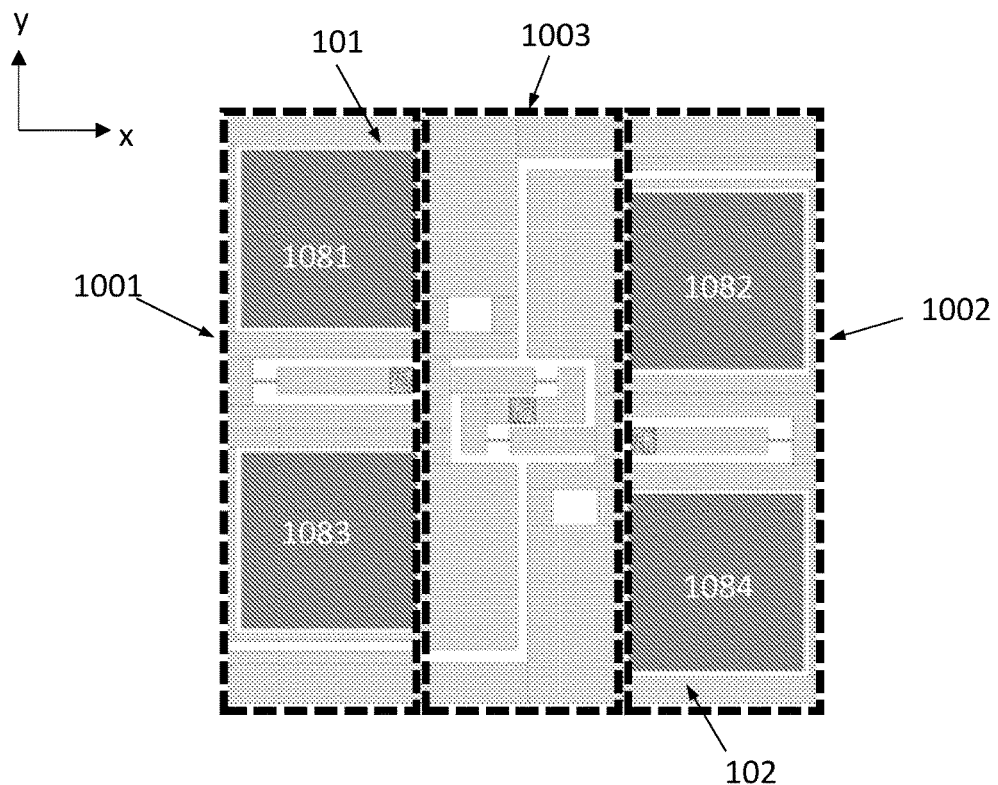
FIG. 10 illustrates central regions and edge regions.
Figure 11A:
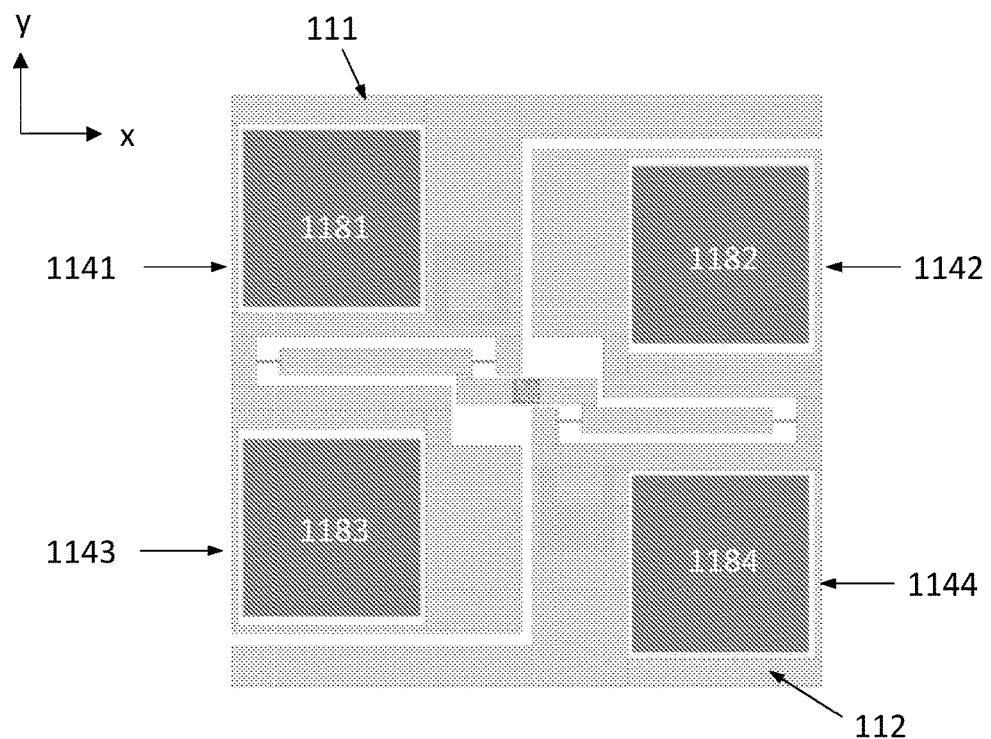
FIGS. 11a-11d illustrate additional elements measuring acceleration.
Figure 11B:
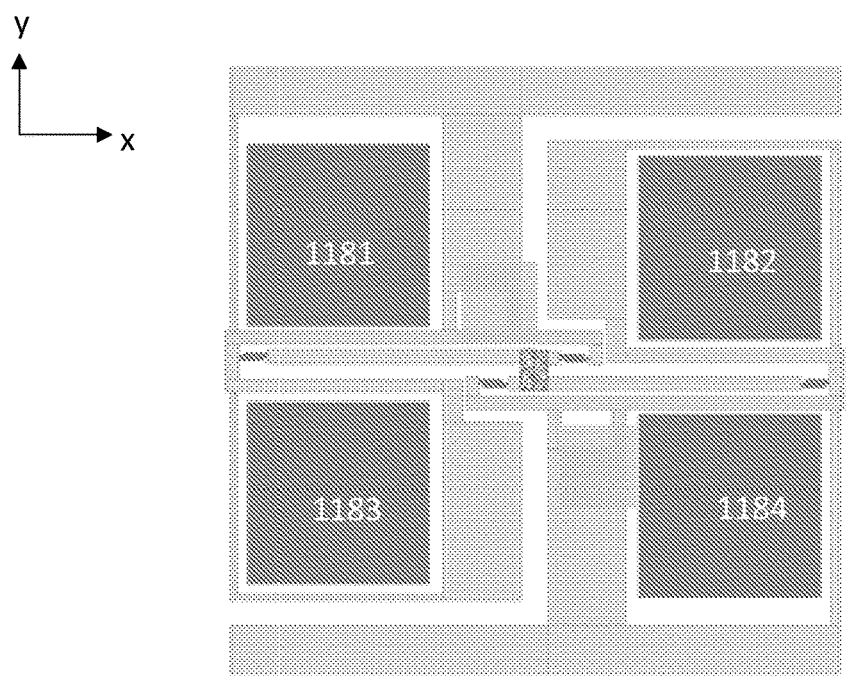
Figure 11C:
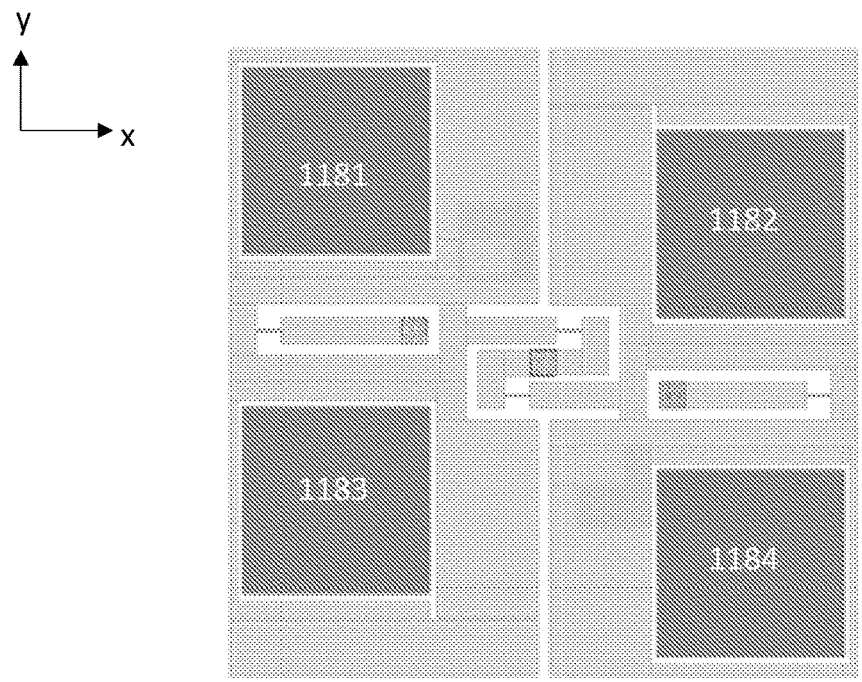
Figure 11D:
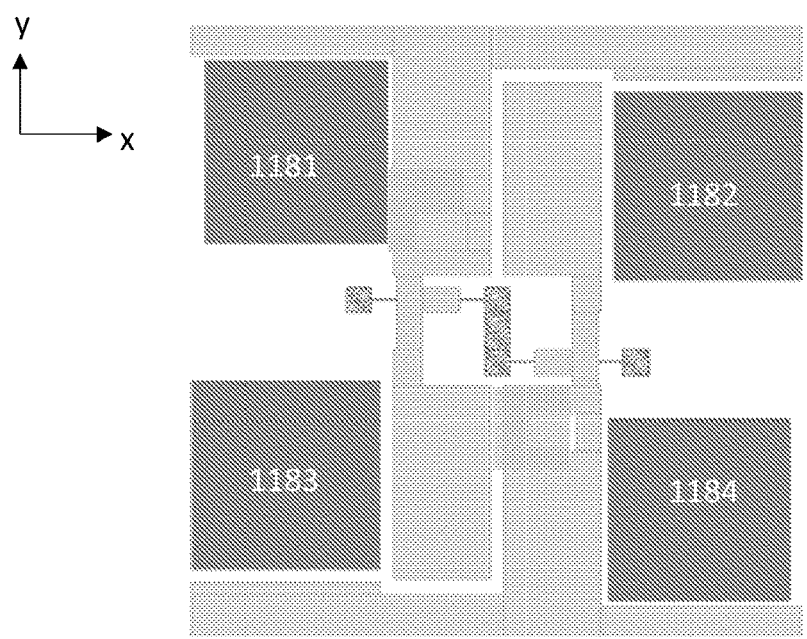

In any embodiment of this disclosure, the first, second, third and fourth measurement regions may be adjacent to each other in the middle of the area defined by the first and second proof masses. In other words, the accelerometer may comprise a central line in the direction of the y-axis, and each measurement region may lie adjacent to this central line. FIG. 10 illustrates that the accelerometer presented in this disclosure may for example have a central region 1003 and two edge regions 1001-1002. The central region 1003 lies between the edge regions 1001-1002 in the x-direction. All measurement regions may be located within the central region 1003. Additional elements or electronics which do not form a part of the proof mass 101/102, such as elements 1081-1084 in FIG. 10, may be located in the edge regions 1001-1002. As mentioned before, the two proof masses may have the same shape and size, but they may be oriented in different directions in relation to their respective rotation axes.

The proof mass geometry illustrated in the preceding figures allows additional elements to be placed within the square or rectangular area defined by the first and second proof masses. These elements could for example be sensors which measure acceleration in the direction of the x-axis or in the direction of the y-axis. FIGS. 11a-11d illustrate accelerometers with proof masses and suspension arrangements which correspond to those which have been presented in the preceding figures.

In each of FIGS. 11a-11d, the accelerometer also comprises a first element 1181 for measuring acceleration in the direction of the x-axis and/or the y-axis, and the first element 1181 is located in an opening in the first proof mass 111 so that the first proof mass surrounds the first element on all sides, and the accelerometer also comprises a second element 1182 for measuring acceleration in the direction of the x-axis and/or the y-axis, and the second element is located in an opening in the second proof mass 112 so that the second proof mass surrounds the second element 1182 on all sides.

Optionally, the accelerometer may also comprises a third element 1183 for measuring acceleration in the direction of the x-axis and/or the y-axis, and the third element 1183 may be located in an opening in the first proof mass 111 so that the first proof mass surrounds the third element on all sides, and the accelerometer may also comprise a fourth element 1184 for measuring acceleration in the direction of the x-axis and/or the y-axis, and the fourth element may be located in an opening in the second proof mass 112 so that the second proof mass surrounds the fourth element 1184 on all sides.

The first and second proof masses here comprise connecting bars 1141-1144 which connect the first or second end of the respective proof mass to its middle part along the edge of the accelerometer. Each element for measuring acceleration in the direction of the x-axis and/or the y-axis lies inside such a bar.

The elements 1181-1184 may be any kind of acceleration sensor which is configured to measure acceleration in the direction of the x-axis, in the direction of the y-axis or in both of these directions.

Further Options

In some embodiments illustrated in this disclosure (see for example FIGS. 4, 7 and 8b), the geometry of the suspension structure is such that the x-coordinate of the first torsion element (such as 451) which is furthest to the right is greater than the x-coordinate of the second torsion element (such as 452 which is furthest to the left. The x-coordinate of an optional central anchor point (such as 481) may lie between the x-coordinates of these first and second torsion elements. As mentioned before, when suspension structures comprise two torsion elements attached to the same proof mass, it is often preferable to place these torsion elements far apart from each other.

It is typically advantageous to place anchor points close to each other. Mechanical stresses will then influence the proof masses less. The first and second proof masses may both comprise openings where an anchor point and the corresponding suspension structure is located, as for example in FIGS. 7 and 8a-8b. The accelerometer may alternatively comprise side anchor points which are not surrounded by either proof mass, such as 582 and 583 in FIG. 5. A central anchor point may be located between the first and second proof masses, as in FIG. 5, 6 or 7.

Figure 12:
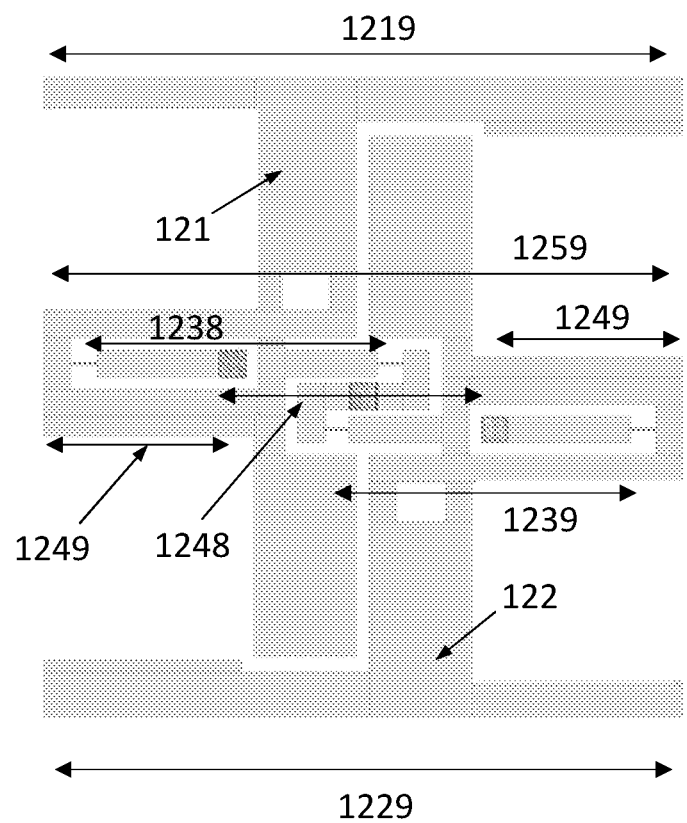
FIG. 12 illustrates relative distances in an accelerometer.

FIG. 12 illustrates relative distances using the device from FIG. 7 as an example. Reference numbers 121 and 122 correspond to reference numbers 21 and 22, respectively, in FIG. 2a. The two side anchor points may correspond to the side anchor points illustrated in any preceding figure, and the central anchor point may correspond to a central anchor point illustrated in any preceding figure. The distance 1238 in the x-direction from the left side first torsion element to the right side first torsion element may be compared to the maximum width 1219 of the first proof mass 121. Correspondingly, the distance 1239 in the x-direction from the left side second torsion element to the right side second torsion element may be compared to the maximum width 1229 of the second proof mass 122. The ratios 1238/1219 and 1239/1229 may for example be greater than 0.5, greater than 0.75 or greater than 1.

Furthermore, the portion of the width 1219 which falls in the same range of x-coordinates as 1238 may be greater than 50%, greater than 75% or greater than 90%. Similarly, the portion of the width 1229 which falls in the same range of x-coordinates as 1239 may be greater than 50%, greater than 75% or greater than 90%.

The distance 1248 between two side anchor points may be less than the distance 1249 between the first side anchor point and the edge of the first proof mass on the rotation axis and similarly less than the corresponding distance between the second proof mass and the second side anchor point. Alternatively, the distance 1248 may be less than two times or less than three times the distance 1249.

The width of the entire accelerometer structure in the x-direction, from the left edge of the first proof mass 121 to the right edge of the second proof mass 122, is indicated with reference number 1259 in FIG. 12. In this figure the width 1259 is equal to the maximum widths 1219 and 1229 of the two proof masses because the left edges and right edges of both proof masses coincide, but the width 1259 could also be greater than each of the widths 1219 and 1229 if the proof mass edges do not coincide in this way. The ratio 1248/1259 could for example be less than 70%, less than 60%, less than 50%, less than 40% or less than 40%.

All distance options presented above are applicable to all embodiments presented in this disclosure where the elements under discussion are present.

In general, in any embodiments where two side anchor points are used, the first side anchor point may lie on the first rotation axis and the second side anchor point may lie on the second rotation axis. If one central anchor point is also used, the y-coordinate of the one central anchor point may lie between the y-coordinate of the first rotation axis and the y-coordinate of the second rotation axis. Alternatively, the central anchor point can extend from the first rotation axis to the second rotation axis. If multiple central anchor points are used, then there may be one central anchor point on both rotation axes.

The invention claimed is:

1. A microelectromechanical accelerometer for measuring acceleration in a direction of a z-axis which is perpendicular to an xy-plane defined by a device layer, comprising:
a mobile first proof mass; and
a mobile second proof mass formed in the device layer and suspended from one or more fixed parts of the accelerometer by a suspension structure,
wherein the first proof mass is adjacent to the second proof mass in the xy-plane, the suspension structure allows the first proof mass to undergo rotation out of the xy-plane about a first rotation axis, and the suspension structure allows the second proof mass to undergo rotation out of the xy-plane about a second rotation axis,
wherein the first and the second rotation axes are parallel to each other and define an x-direction which is parallel to the first and the second rotation axes and a y-direction which is perpendicular to the x-direction, and a y-coordinate of a center of mass of the first proof mass is greater than a y-coordinate of the first rotation axis, and a y-coordinate of a center of mass of the second proof mass is less than a y-coordinate of the second rotation axis, and the y-coordinate of the first rotation axis is greater than the y-coordinate of the second rotation axis by a nonzero distance D, wherein the accelerometer comprises a first counter-electrode and a second counter-electrode which are adjacent to the first proof mass in the z-direction, and a size and geometry of the first counter electrode together with adjacent edges of the first proof mass define a first measurement region on the first proof mass on a first side of the first rotation axis, and a size and geometry of the second counter electrode together with the adjacent edges of the first proof mass define a second measurement region on the first proof mass on a second side of the first rotation axis, wherein the accelerometer comprises a third counter-electrode and a fourth counter-electrode which are adjacent to the second proof mass in the z-direction, and a size and geometry of the third counter electrode together with adjacent edges of the second proof mass define a third measurement region on the second proof mass on a first side of the second rotation axis, and a size and geometry of the fourth counter electrode together with the adjacent edges of the second proof mass define a fourth measurement region on the second proof mass on a second side of the second rotation axis, wherein areas and shapes of the first, second, third and fourth measurement regions are all substantially equal in the xy-plane, the first measurement region and the second measurement region are substantially reflection-symmetric with respect to the first rotation axis, and the third measurement region and the fourth measurement region are substantially reflection-symmetric with respect to the second rotation axis, wherein the distance in the y-direction from the first rotation axis to a border of the first measurement region is nonzero, wherein the distance in the y-direction from the second rotation axis to a border of the third measurement region is equal to the distance in the y-direction from the first rotation axis to the border of the first measurement region, and wherein a first end of the first proof mass has a first y-coordinate and a second end of the first proof mass has a second y-coordinate, and the first y-coordinate differs from the second y-coordinate, and a first end of the second proof mass has a third y-coordinate and a second end of the second proof mass has a fourth y-coordinate, and the third y-coordinate differs from the fourth y-coordinate, and the first measurement region extends substantially to the first y-coordinate, and the second measurement region extends substantially to the second y-coordinate, and the third measurement region extends substantially to the third y-coordinate, and wherein the fourth measurement region extends substantially to the fourth y-coordinate.

2. The accelerometer according to claim 1, wherein the one or more fixed parts comprise a central anchor point located between the first proof mass and the second proof mass in the xy-plane.

3. The accelerometer according to claim 2, wherein a y-coordinate of the central anchor point lies between the y-coordinate of the first rotation axis and the y-coordinate of the second rotation axis, the suspension structure comprises a first rigid extension which extends from the central anchor point to the first rotation axis, the suspension structure further comprises at least one first torsion element which extends from the first rigid extension to the first proof mass, the suspension structure comprises a second rigid extension which extends from the central anchor point to the second rotation axis, and the suspension structure further comprises at least one second torsion element which extends from the second rigid extension to the second proof mass.

4. The accelerometer according to claim 2, wherein the central anchor point extends from the first rotation axis to the second rotation axis, the suspension structure comprises two first rigid extensions which extend from the central anchor point along the first rotation axis, and the suspension structure further comprises two first torsion elements, and each first torsion element extends from one of the two first rigid extensions to the first proof mass, the suspension structure also comprises two second rigid extensions which extend from the central anchor point along the second rotation axis, the suspension structure further comprises two second torsion elements, and each second torsion element extends from one of the two second rigid extensions to the second proof mass.

5. The accelerometer according to claim 2, wherein the central anchor point extends from the first rotation axis to the second rotation axis, the one or more fixed parts also comprise a first side anchor point located on the first rotation axis on a side of the first proof mass in the xy-plane and a second side anchor point located on the second rotation axis on a side of the second proof mass in the xy-plane, and the suspension structure comprises a first side torsion element which extends from the first side anchor point to the first proof mass, a first central torsion element which extends from the central anchor point to the first proof mass, a second central torsion element which extends from the central anchor point to the second proof mass and a second side torsion element which extends from the second side anchor point to the second proof mass.

6. The accelerometer according to claim 2, wherein the one or more fixed parts also comprise a first side anchor point located on the first rotation axis on a side of the first proof mass in the xy-plane and a second side anchor point located on the second rotation axis on a side of the second proof mass in the xy-plane, the suspension structure comprises a first side torsion element which extends from the first side anchor point to the first proof mass, the suspension structure comprises a first central torsion element which extends from the central anchor point to the first proof mass, the suspension structure also comprises a second central torsion element which extends from the central anchor point to the second proof mass, and the suspension structure also comprises a second side torsion element which extends from the second side anchor point to the second proof mass.

7. The accelerometer according to claim 2, wherein a y-coordinate of the central anchor point lies between the y-coordinate of the first rotation axis and the y-coordinate of the second rotation axis, the one or more fixed parts also comprise a first side anchor point located on the first rotation axis on a side of the first proof mass in the xy-plane and a second side anchor point located on the second rotation axis on a side of the second proof mass in the xy-plane, the suspension structure comprises a first rigid extension which extends from the first side anchor point along the first rotation axis and a second rigid extension which extends from the central anchor point to the first rotation axis, and the suspension structure comprises a first torsion element which extends from the first rigid extension to the first proof mass and a second torsion element which extends from the second rigid extension to the first proof mass, and wherein the suspension structure further comprises a third rigid extension which extends from the central anchor point to the second rotation axis and a fourth rigid extension which extends from the second side anchor point along the second rotation axis, and the suspension structure comprises a third torsion element which extends from the third rigid extension to the second proof mass and a fourth torsion element which extends from the fourth rigid extension to the second proof mass.

8. The accelerometer according to claim 1, wherein the one or more fixed parts comprise a first side anchor point located on the first rotation axis in an opening in the first proof mass in the xy-plane and a second side anchor point located on the second rotation axis in an opening in the second proof mass in the xy-plane, the suspension structure comprises one or more first rigid extensions which extend from the first side anchor point along the first rotation axis, the suspension structure further comprises one or more first torsion elements which extend from said one or more first rigid extensions to the first proof mass, and the suspension structure also comprises one or more second rigid extensions which extend from the second side anchor point along the second rotation axis, and the suspension structure further comprises one or more second torsion elements which extend from said one or more second rigid extensions to the second proof mass.

9. The accelerometer according to claim 1, wherein the one or more fixed parts comprise a first central anchor point and a second central anchor point located between the first proof mass and the second proof mass in the xy-plane, a first side anchor point located on a side of the first proof mass in the xy-plane and a second side anchor point located on a side of the second proof mass in the xy-plane, and the suspension structure comprises a first central torsion element which extends from the first central anchor point to the first proof mass and a second central torsion element which extends from the second central anchor point to the second proof mass.

10. The accelerometer according to claim 9, wherein the suspension structure comprises a first rigid side extension which extends from the first side anchor point along the first rotation axis and a second rigid side extension which extends from the second side anchor point along the second rotation axis, and the suspension structure comprises a first side torsion element which extends from the first rigid side extension to the first proof mass and a second side torsion element which extends from the second rigid side extension to the second proof mass.

11. The accelerometer according to claim 9, wherein the suspension structure comprises a first side torsion element which extends from the first side anchor point to the first proof mass and a second side torsion element which extends from the second side anchor point to the second proof mass.

12. The accelerometer according to claim 1, wherein the first, second, third and fourth measurement regions are adjacent to each other in a middle of an area defined by the first and second proof masses.

13. The accelerometer according to claim 1, wherein the accelerometer also comprises a first element for measuring acceleration in a direction of a x-axis and/or a y-axis, and the first element is located in an opening in the first proof mass so that the first proof mass surrounds the first element on all sides, the accelerometer also comprises a second element for measuring acceleration in the direction of the x-axis and/or the y-axis, and the second element is located in an opening in the second proof mass so that the second proof mass surrounds the second element on all sides.

* * * * *